(12) United States Patent
Murakami et al.

(10) Patent No.: US 7,884,986 B2
(45) Date of Patent: Feb. 8, 2011

(54) OPTICAL SCANNING DEVICE, OPTICAL SCANNING DISPLAY DEVICE, AND OPTICAL SCANNING METHOD

(75) Inventors: Kenichi Murakami, Mie (JP); Nobuaki Asai, Gifu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 508 days.

(21) Appl. No.: 11/902,887

(22) Filed: Sep. 26, 2007

(65) Prior Publication Data
US 2008/0204839 A1 Aug. 28, 2008

Related U.S. Application Data

(63) Continuation-in-part of application No. PCT/JP2006/306113, filed on Mar. 27, 2006.

(30) Foreign Application Priority Data
Mar. 29, 2005 (JP) ............................. 2005-094672

(51) Int. Cl.
G02B 26/08 (2006.01)
(52) U.S. Cl. ................................. 359/199.4; 359/224.1
(58) Field of Classification Search .... 359/196.1–226.3
See application file for complete search history.

(56) References Cited

U.S. PATENT DOCUMENTS

2002/0125228 A1* 9/2002 Smart et al. ............ 219/121.62

FOREIGN PATENT DOCUMENTS

| JP | A 53-145513 | 12/1978 |
|---|---|---|
| JP | A-53-145513 | 12/1978 |
| JP | A 54-089673 | 7/1979 |
| JP | A-54-89673 | 7/1979 |
| JP | A-56-19024 | 2/1981 |
| JP | A 56-019024 | 2/1981 |
| JP | A 58-143315 | 8/1983 |
| JP | A-58-143315 | 8/1983 |
| JP | A-3-134613 | 6/1991 |
| JP | A 03-134613 | 6/1991 |
| JP | A 07-049462 | 2/1995 |
| JP | A-7-49462 | 2/1995 |

OTHER PUBLICATIONS

Urey H. et al; (Aug. 2003); "Biaxial MEMS Raster Scanner with Linear Ramp Drive"; Optical MEMS; IEEE; pp. 161-162.
Urey, Hakan et al., "Biaxial MEMS Raster Scanner with Linear Ramp Drive," Optical MEMS, IEEE, 2003, 161-162.
Aug. 16, 2010 Office Action for Japanese Patent Application No. 2005-094672 (with translation).

* cited by examiner

*Primary Examiner*—Stephone B Allen
*Assistant Examiner*—Jennifer L. Doak
(74) *Attorney, Agent, or Firm*—Oliff & Berridge, PLC (57) ABSTRACT

An optical scanning device is provided with a scanning unit including an oscillating element which is elastically and rotatably supported so as to rotatably oscillate, a light beam incident on the scanning unit being deflected to scan as the oscillating element oscillates, a scanning signal generating unit which generates a scanning signal, the scanning signal including a sawtooth wave part and a corrective wave part which is formed based on a resonance frequency intrinsic to the scanning unit, and a driving unit which drives the scanning unit to oscillate the oscillating element in accordance with the scanning signal.

20 Claims, 7 Drawing Sheets

| SAMPLING TIMING | SAMPLING DATA |
|---|---|
| $t_0$ | 0 |
| $t_1$ | $\Delta V$ |
| $t_2$ | $2\Delta V$ |
| ⋮ | ⋮ |
| $t_{i-2}$ | $254\Delta V$ |
| $t_{i-1}$ | $255\Delta V$ |
| $t_i$ | 0 |
| $t_{i+1}$ | $A\sin(\omega\gamma \cdot \Delta t)$ |
| $t_{i+2}$ | $A\sin(\omega\gamma \cdot 2\Delta t)$ |
| ⋮ | ⋮ |
| $t_{i+m}$ | $A\sin(\omega\gamma \cdot m\Delta t)$ $= A\sin(\pi/2) = A$ |
| ⋮ | ⋮ |
| $t_{i+2m-2}$ | $A\sin\{\omega\gamma \cdot 2(m-1)\Delta t\}$ $= A\sin(\pi - \omega\gamma \cdot 2\Delta t)$ |
| $t_{i+2m-1}$ | $A\sin\{\omega\gamma \cdot (2m-1)\Delta t\}$ $= A\sin(\pi - \omega\gamma \cdot \Delta t)$ |
| $t_{i+2m}$ | $A\sin(\omega\gamma \cdot 2m\Delta t)$ $= A\sin\pi = 0$ |
| $t_{i+2m+1}$ | 0 |
| ⋮ | ⋮ |
| $t_{i+4m-1}$ | 0 |
| $t_{i+4m}$ | 0 |

OPTICAL SCANNING DEVICE, OPTICAL SCANNING DISPLAY DEVICE, AND OPTICAL SCANNING METHOD

CROSS-REFERENCE TO RELATED APPLICATIONS

This is a Continuation-in-Part of International Application No. PCT/JP2006/306113 filed on Mar. 27, 2006, which claims priority from Japanese Patent Application No. 2005-094672 filed on Mar. 29, 2005. The entire disclosure of the prior applications is incorporated herein by reference.

BACKGROUND OF THE INVENTION

1. Technical Field

The present invention relates to an optical scanning device, an optical scanning display device and an optical scanning method.

2. Related Art

Various types of optical scanning devices have been proposed so far, such as a raster scanner disclosed in Hakan Urey, Randy Sprague, "Biaxial MEMS Raster Scanner with Linear Ramp Drive", Optical MEMS 2003, IEEE-LEOS, Waikoloa, Hawaii, August 2003, teachings of which are incorporated herein by reference. The raster scanner is designed to scan incident light according to an oscillating action of a scanning mirror. In the raster scanner, a vertical scanning signal employed for vertical scanning is made up of sawtooth waves. Thus, the vertical scanning signal rises from its minimum level to its maximum level linearly with the passage of vertical scanning time and thereafter returns instantly to the minimum level in each cycle. As above, the scanning mirror in a raster scanner oscillates according to the aforementioned change in the level of the vertical scanning signal.

However, in the raster scanner described above, a rebound occurs to the scanning mirror when the vertical scanning signal instantly returns from the maximum level to the minimum level during the oscillating process of the scanning mirror according to the level change of the vertical scanning signal.

Since the scanning mirror is generally supported with respect to the scanning devise via an elastic beam member so as to allow for the oscillation of the scanning mirror. Therefore, each raster scanner has an intrinsic resonance frequency which is determined by the configuration of the scanning mirror and characteristics of the elastic beam member.

Therefore, when the resonance frequency of the raster scanner is included in frequencies caused by the rebound, resonant vibration occurs to the scanning mirror. Due to the resonant vibration, the scanning mirror becomes incapable of following the level change of the vertical scanning signal after the aforementioned return, by which a pulsating motion of the scanning mirror (differing from the level change of the vertical scanning signal) is caused. As a result, the vertical scanning of the incident light can not be conducted desirably.

The present invention is advantageous in that an improved optical scanning device, an optical scanning display device and/or an optical scanning method are provided, that are configured to form a scanning signal having a waveform elaborately designed by making effective use of a sawtooth wave and to excellently carry out the scanning of light by use of the scanning signal.

In accordance with an aspect of the present invention, there is provided an optical scanning device having a scanning element including an oscillating member which is elastically supported to be capable of oscillating, scanning signal generating unit which generates a scanning signal within a predetermined period, the scanning signal including a sawtooth wave part and a corrective wave part which is formed based on an intrinsic resonance frequency of the scanning element, to suppress the resonance vibration of and driving means which drives the oscillating member to oscillate it according to the generated scanning signal.

In the optical scanning device configured as above, when the corrective wave part is formed to suppress the resonance vibration of the scanning element based on the intrinsic resonance frequency of the scanning element, the resonance vibration of the scanning element (executing the scanning according to the sawtooth wave part included in the scanning signal) is effectively suppressed by the corrective wave part. Consequently, the scanning by the scanning element can be carried out excellently.

In accordance with another aspect of the present invention, there is provided an image display device, which is provided with a beam emitting unit which emits a beam carrying image information, a horizontal scanning unit which horizontally scans the beam emitted by the beam emitting unit, a vertical scanning unit which vertically scans the beam scanned by the horizontally scanned unit. At least one of the horizontal scanning unit and the vertical scanning unit is implemented by an optical scanning device which includes the scanning device described above.

In accordance with a further aspect of the invention, there is provided a method for driving a scanning unit including an oscillating element which is elastically supported to be capable of oscillating, which includes the steps of generating a driving signal including a sawtooth wave part and a corrective wave part which is formed based on a resonance frequency intrinsic to the scanning unit, within a predetermined period, and driving the scanning unit in accordance with the driving signal.

In the optical scanning device, image display device, and method for driving a scanning unit configured as above, since the resonance of the scanning element is suppressed by the corrective wave part, the scanning can be carried out excellently.

DETAILED DESCRIPTION OF THE EMBODIMENT

Referring now to the drawings, a description will be given in detail of a preferred embodiment in accordance with the present invention.

Figure 1:
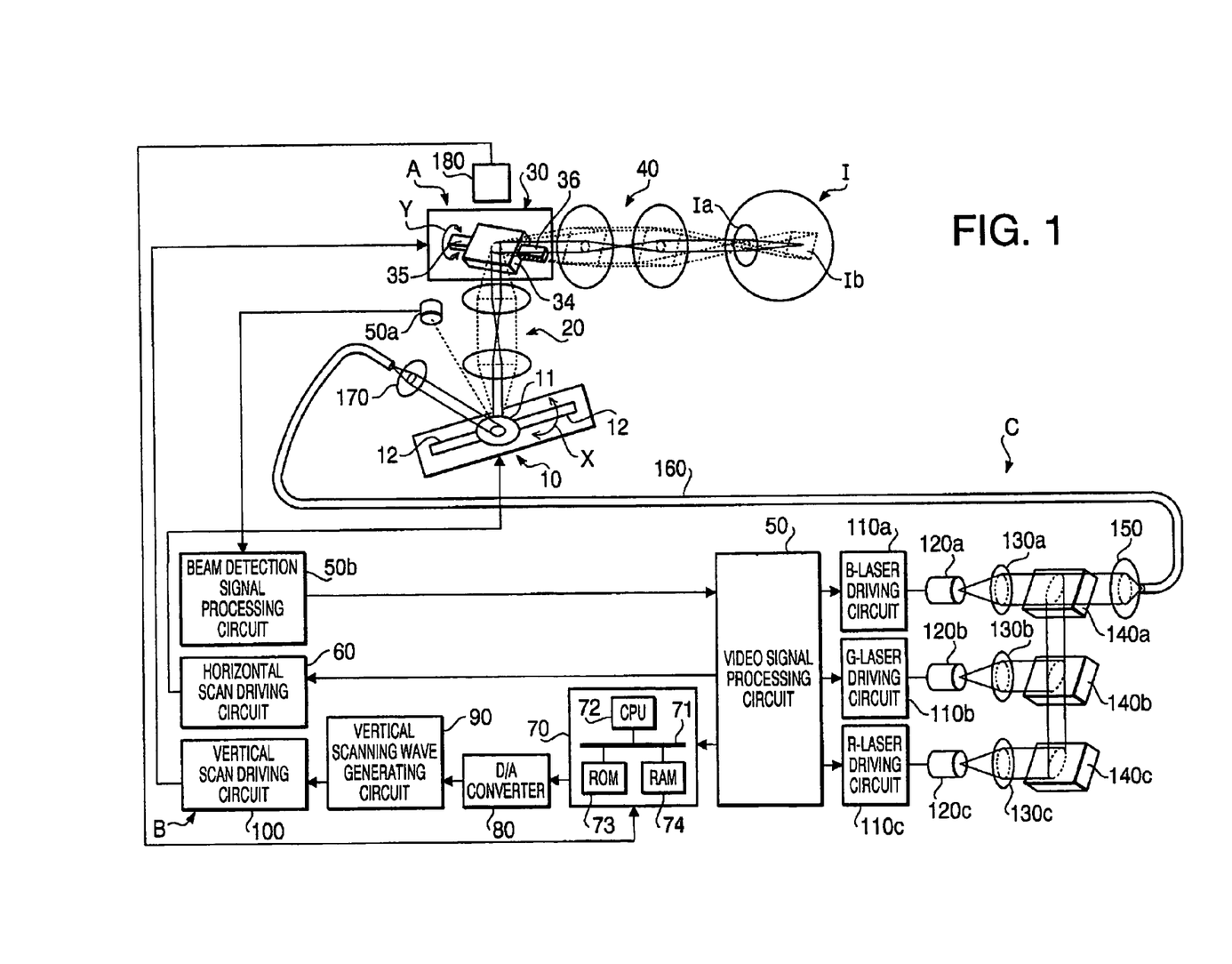
FIG. 1 is a schematic block diagram showing an embodiment of a retinal scanning image display device to which the present invention is applied.

FIG. 1 shows an embodiment of a retinal scanning image display device in accordance with the present invention. The image display device, designed to be used for the left eye of the user, includes an optical scanning device A, a signal processing device B and a beam generating device C.

As shown in FIG. 1, the optical scanning device A includes a horizontal scanning mechanism 10, a relay optical system 20, a vertical scanning mechanism 30 and a relay optical system 40.

The horizontal scanning mechanism 10 includes a reflecting plate 11 for the horizontal scanning and a pair of beam members 12. The pair of beam members 12 are elastic members, which are arranged coaxially, and fixed to the optical scanning device A via a stationary member. The reflecting plate 11 is placed between and supported by the pair of beam members 12 so that it can rotatably oscillate in the direction of the arrow X.

The horizontal scanning mechanism 10 is driven by a horizontal scan driving circuit 60 (explained later) of the signal processing device B and thereby oscillates the reflecting plate 11 in the direction of the arrow X. The horizontal scanning mechanism 10 reflects a collimated beam carrying image information supplied from a collimator lens 170 (explained later) of the beam generating device C so as to horizontally scan the collimated beam according to the oscillation angles of the reflecting plate 11, and thereby outputs a horizontally scanned beam carrying image information.

The relay optical system 20 relays the horizontally scanned beam to the vertical scanning mechanism 30.

Figure 2:
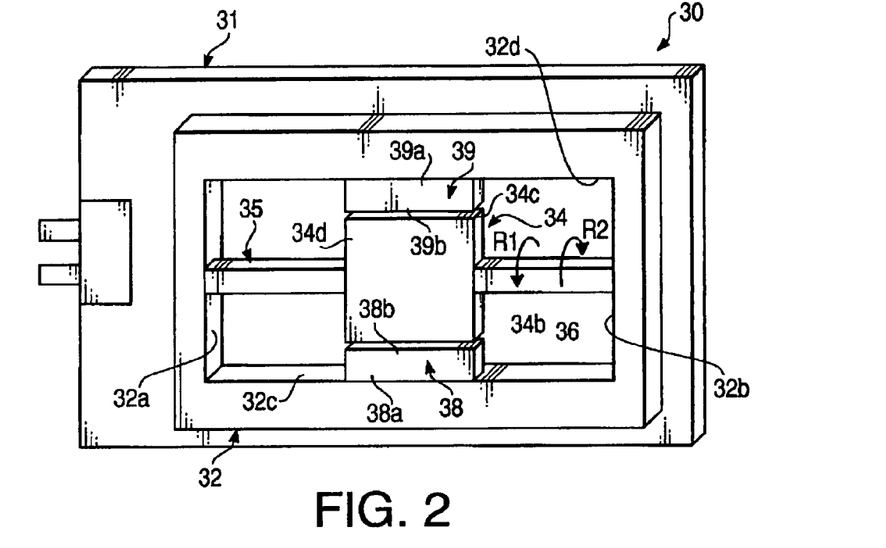
FIG. 2 is an enlarged perspective view of a vertical scanning mechanism shown in FIG. 1.

As shown in FIG. 2, the vertical scanning mechanism 30 includes a substrate 31 and a rectangular plate frame 32 which is mounted on the substrate 31.

The vertical scanning mechanism 30 further includes a reflecting plate 34 (in the shape of a square plate) for the vertical scanning and the two beam members 35 and 36. As shown in FIG. 2, the reflecting plate 34 is supported by the beam member 35 (at the center of the left edge of the reflecting plate 34 in FIG. 2) on the central part of an inner wall 32a of the plate frame 32. The reflecting plate 34 is supported also by the beam member 36 (at the center of the right edge of the reflecting plate 34 in FIG. 2) on the central part of an inner wall 32b of the plate frame 32.

Each of the beam members 35 and 36 is formed as a long beam made of elastic material so that it can be twisted. The beam members 35 and 36 support the reflecting plate 34 inside the hollow part of the plate frame 32 so as to allow for the oscillation of the reflecting plate 34 in the directions of the arrows R1 and R2 in FIG. 2 (in the direction of the arrow Y in FIG. 1). The thickness of the reflecting plate 34 is sufficiently thin so that, even if the reflecting plate 34 oscillates, it does not interfere with the substrate 31.

Figure 3:
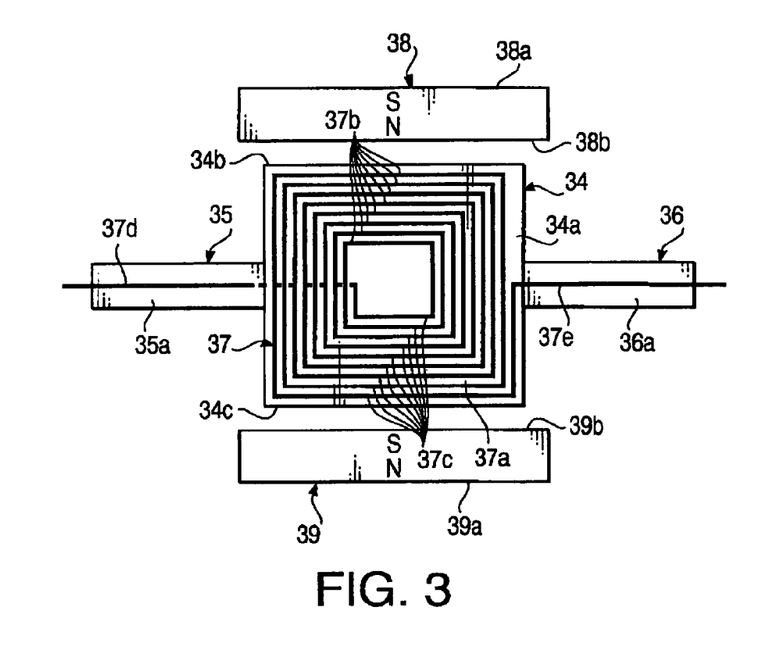
FIG. 3 is a schematic diagram of a reflecting plate, beam members and magnets of the vertical scanning mechanism viewed from the back.

The vertical scanning mechanism 30 further includes an electromagnetic coil 37 and magnets 38 and 39 as shown in FIGS. 2 and 3. The electromagnetic coil 37 includes a coil unit 37a on back 34a of the reflecting plate 34 as shown in FIG. 3. The coil unit 37a is made up of a plurality of coil segments which are arranged like a rectangular whirlpool. As shown in FIG. 3, the coil of the coil unit 37a is wound up counterclockwise (from the inner end to the outer end) in FIG. 3 like a rectangular whirlpool and is coaxially attached to the back 34a of the reflecting plate 34. Incidentally, the way (direction, shape, etc.) of winding up the coil can be modified in various ways. For example, the direction of winding up the coil can also be the clockwise direction and the shape of winding up the coil can also be like concentric circles.

Coil segments 37b of the coil unit 37a are situated between the center and one lateral edge 34b of the reflecting plate 34 to be in parallel with the lateral edge 34b as shown in FIG. 3. Meanwhile, coil segments 37c of the coil unit 37a are situated between the center and the other lateral edge 34c of the reflecting plate 34 to be in parallel with the lateral edge 34c as shown in FIG. 3.

The electromagnetic coil 37 has an inner end connecting terminal 37d and an outer end connecting terminal 37e as shown in FIG. 3. The inner end connecting terminal 37d, each extending from the inner end of the coil unit 37a, is attached on the back 35a of the beam member 35 along the length of the beam member 35. On the other hand, the outer end connecting terminal 37e, extending from the outer end of the coil unit 37a, is attached on the back 36a of the beam member 36 along the length of the beam member 36.

Each of the magnets 38 and 39 is formed of permanent magnet material in the shape of a rectangular parallelepiped. The magnet 38 is placed between an inner wall 32c of the plate frame 32 and one lateral edge 34b of the reflecting plate 34 as shown in FIG. 2. The outer edge 38a of the magnet 38 (in regard to its width direction) is fixed on the center of an inner wall 32c of the plate frame 32 (in regard to the lengthwise direction of the inner wall 32c). With this configuration, the inner edge 38b of the magnet 38 (in regard to its width direction) faces one lateral edge 34b of the reflecting plate 34 via a prescribed gap as shown in FIGS. 2 and 3.

Meanwhile, the magnet 39 is placed between an inner wall 32d of the plate frame 32 and the other lateral edge 34c of the reflecting plate 34 as shown in FIG. 2. The outer edge 39a of the magnet 39 (in regard to its width direction) is fixed on the center of an inner wall 32d of the plate frame 32 (in regard to the lengthwise direction of the inner wall 32d) as shown in FIG. 2. With this configuration, the inner edge 39b of the magnet 39 (in regard to its width direction) faces the other lateral edge 34c of the reflecting plate 34 via a prescribed gap as shown in FIGS. 2 and 3. In this embodiment, the outer edge 38a and the inner edge 38b of the magnet 38 (in regard to its width direction) form a south pole and a north pole, respectively. In this embodiment, the outer edge 39a and the inner edge 39b of the magnet 39 (in regard to its width direction) form a north pole and a south pole, respectively.

Here, magnetic interaction between the electromagnetic coil 37 and the magnets 38 and 39 configured as above will be explained below.

When an electric current flows into the coil unit 37a via the inner end connecting terminal 37d, magnetic force in a thickness direction of the reflecting plate 34 (in a direction according to the Fleming's left-hand rule) occurs between the electric current flowing through each coil segment 37b and the north pole formed by the inner edge 38b of the magnet 38. Meanwhile, magnetic force in a thickness direction of the reflecting plate 34 (in a direction according to the Fleming's left-hand rule) occurs between the electric current flowing through each coil segment 37c and the south pole formed by the inner edge 39b of the magnet 39.

The direction of the electric current flowing through each coil segment 37b is opposite to that of the electric current flowing through each coil segment 37c on the back 34a of the reflecting plate 34, and thus the direction of the magnetic force caused by the electric current flowing through each coil segment 37b is opposite to that of the magnetic force caused by the electric current flowing through each coil segment 37c.

Therefore, the reflecting plate 34 rotatably oscillates in accordance with the electrical current flowing through the coil unit 37a (in the direction of R1 or R2), resisting the elastic force of the beam members 35 and 36. That is, the reflecting plate 34 receives the magnetic force to the coil segments 37b and the magnetic force to the coil segments 37c which are applied in opposite directions according to the electric current flowing into the coil unit 37a via the inner end connecting terminal 37d and rotates in the direction of the arrow R1 in FIG. 2 under the control of the twisting action of the beam members 35 and 36. The vertical scanning mechanism 30 reflects and scans the incident beam with the surface of the reflecting plate 34 (reflecting surface 34d) according to the rotation of the reflecting plate 34 in the direction of the arrow R1.

On the other hand, when an electric current flows into the coil unit 37a via the outer end connecting terminal 37e, electric currents flow through each coil segment 37b and each coil segment 37c in directions opposite to those in the above case where an electric current flows into the coil unit 37a via the inner end connecting terminal 37d.

Therefore, the direction of the magnetic force caused by the electric current flowing through each coil segment 37b and the direction of the magnetic force caused by the electric current flowing through each coil segment 37c are also opposite to those in the above case where an electric current flows into the coil unit 37a via the inner end connecting terminal 37d.

Therefore, the reflecting plate 34 (receiving the magnetic force to the coil segments 37b and the magnetic force to the coil segments 37c which are applied in opposite directions according to the electric current flowing into the coil unit 37a via the outer end connecting terminal 37e) rotates in the direction of the arrow R2 in FIG. 2 under the control of the (opposite) twisting action of the beam members 35 and 36. The vertical scanning mechanism 30 reflects and scans the incident beam with the reflecting surface 34d of the reflecting plate 34, according to the rotation of the reflecting plate 34 in the direction of the arrow R2.

The vertical scanning mechanism 30 outputs vertically scanned beam, by reflecting the horizontally scanned beam from the relay optical system 20 with the reflecting plate 34 while vertically scanning the horizontally scanned beam according to the oscillation angles of the reflecting plate 34. Incidentally, the above directions of the arrows R1 and R2 correspond to the vertical scanning direction which is indicated by the arrow Y in FIG. 1.

The relay optical system 40 converges the vertically scanned beam supplied from the vertical scanning mechanism 30 and applies the converged beam to the pupil Ia of the left eye I as scanned beam.

The signal processing device B includes an optical sensor 50a and a beam detection signal processing circuit 50b as shown in FIG. 1. The optical sensor 50a detects the beam reflected by the reflecting plate 11 of the horizontal scanning mechanism 10 at an end position within a scanning range. The beam detection signal processing circuit 50b executes signal processing to the detected signal supplied from the optical sensor 50a and generates a beam detection signal. Incidentally, the optical sensor 50a is placed in the vicinity of the horizontal scanning mechanism 10.

The signal processing device B further includes a video signal processing circuit 50. The video signal processing circuit 50 receives the signal-processed signal supplied from the beam detection signal processing circuit 50b and a video signal (representing two-dimensional video) supplied from the outside. Based on the signal-processed signal and the video signal, the video signal processing circuit 50 determines output timings of blue, green and red driving signals (for the formation of each frame of the two dimensional video) for each of the horizontal lines forming the frame.

The video signal processing circuit 50 generates the blue, green and red driving signals at each of the output timings. Incidentally, the two-dimensional video is made up of a series of frames, and each of the frames corresponds to the aforementioned horizontal lines.

The video signal processing circuit 50 further generates a horizontal synchronization signal at each of the output timings, while also generating a vertical synchronization signal for the first horizontal line included in the horizontal lines of each frame.

The signal processing device B further includes the aforementioned horizontal scan driving circuit 60. The horizontal scan driving circuit 60 successively generates horizontal scan driving voltages by amplifying the horizontal synchronization signals supplied from the video signal processing circuit 50, and outputs the horizontal scan driving voltages to the horizontal scanning mechanism 10. With this configuration, the horizontal scanning mechanism 10 is driven according to the horizontal scan driving voltages supplied from the horizontal scan driving circuit 60.

The signal processing device B further includes a microcomputer 70. The microcomputer 70 has a CPU 72, a ROM 73 and a RAM 74 (as main components) which are connected together by a bus line 71.

The microcomputer 70 (CPU 72) executes a prescribed program and successively reads out digital vertical scanning wave data from prescribed addresses of the ROM according to the vertical synchronization signals supplied from the video signal processing circuit 50. The "digital vertical scanning wave data" are data to be used for the vertical scanning by the vertical scanning mechanism 30. The digital vertical scanning wave data have previously been stored in the prescribed addresses of the ROM 73 of the microcomputer 70.

Here, the method of formation of the aforementioned digital vertical scanning wave data will be described in detail. The vertical scanning range of the vertical scanning mechanism 30 scanning the light is generally desired to be as wide as possible. From this point of view, a sawtooth wave (having excellent linearity) is suitable as the vertical scanning wave.

However, the vertical scanning mechanism 30 has an intrinsic resonance frequency deriving from the configuration of the reflecting plate 34 and the beam members 35 and 36. Thus, even if the sawtooth wave is directly used as the vertical scanning wave in the vertical scanning mechanism 30, the oscillation of the reflecting plate 34 can not exactly follow the level changes of the sawtooth wave and is necessitated to be disturbed due to the existence of the intrinsic resonance frequency as explained above.

In the embodiment, a suppressive wave part for suppressing the rebound occurring to the reflecting plate 34 when the sawtooth wave instantly returns from the maximum level to the minimum level is additionally provided, as a corrective wave part, to a sawtooth wave part such that the vertical scanning wave (for each period) includes the sawtooth wave part followed by the corrective wave part. With this configuration, it is possible to secure excellent oscillation properties of the reflecting plate 34 while making effective use of the advantage of the sawtooth wave.

Specifically, the vertical scanning wave in this embodiment (hereinafter also referred to as a "vertical scanning wave W") has a prescribed period T and is formed of a sawtooth wave part Wa and a corrective wave part Wb as indicated on an orthogonal coordinate plane in FIG. 4. Incidentally, the orthogonal coordinate plane is a coordinate plane having a horizontal axis representing time and a vertical axis representing the level of the vertical scanning wave.

Since the reflecting plate 34 oscillates in the directions of the arrows R1 and R2 in FIG. 2 as explained above, the range of the oscillation angle of the reflecting plate 34 is determined by the amplitude range of the sawtooth wave part Wa between the minimum level and the maximum level. That is, an effective scanning period of the vertical scanning wave W (see the reference character "Ta" in FIG. 5) is determined by the rising period of the sawtooth wave part Wa from the minimum level to the maximum level. Incidentally, the period of the sawtooth wave part Wa is substantially equal to the effective scanning period Ta since the time necessary for the sawtooth wave part Wa to return from the maximum level to the minimum level is extremely short. In this embodiment, a central level in between the minimum level and the maximum level of the sawtooth wave part Wa is defined as a zero level on the orthogonal coordinate plane, and an oscillation angle of the reflecting plate 34 corresponding to the zero level is defined as 0 degrees. According to these definitions, the aforementioned minimum level and maximum level correspond to a negative maximum level (−Pm) (see FIG. 4) and a positive maximum level (+Pm) (see FIG. 4), respectively. The minimum level and the maximum level are equal in the absolute value. The negative maximum level (−Pm) of the sawtooth wave part Wa corresponds to the start point of the sawtooth wave part Wa. Incidentally, it should be noted that FIG. 5 is a chart for illustrating quantization (described later) and the orthogonal coordinate in this chart represents quantization steps ranging from 0 to 255.

Figure 4:
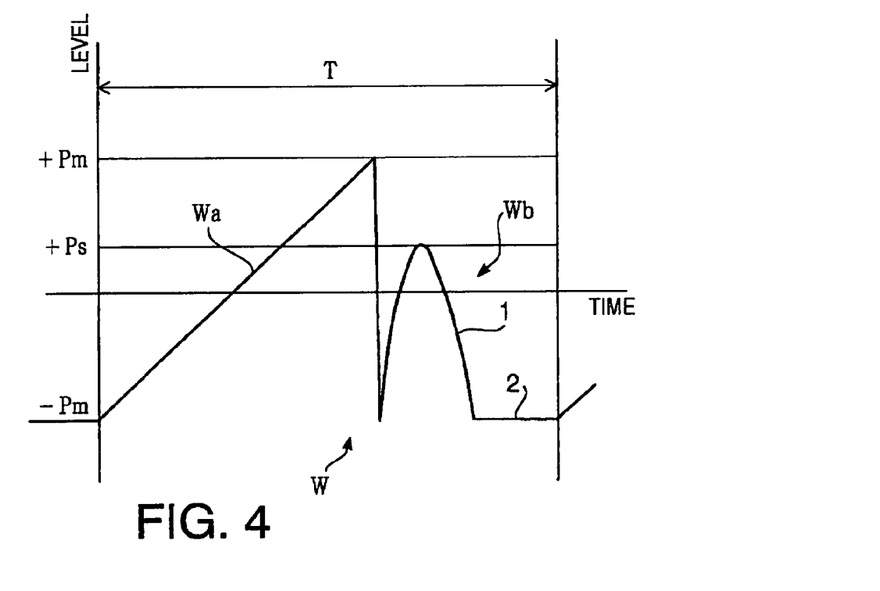
FIG. 4 is a graph showing the configuration of a vertical scanning wave in the embodiment.
Figure 5:
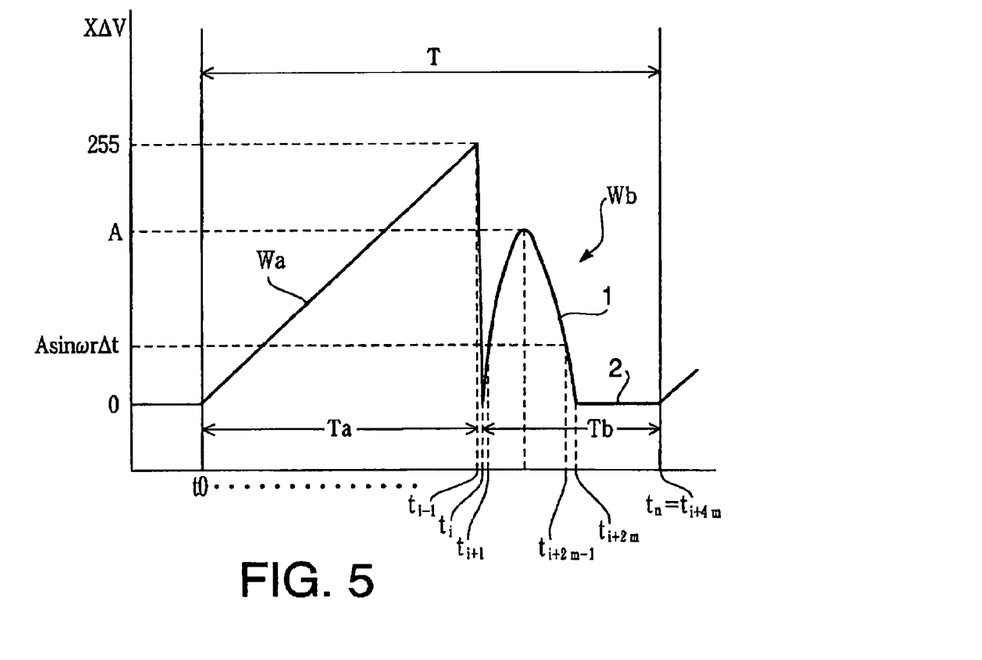
FIG. 5 is a graph for explaining quantization of the vertical scanning wave in the embodiment.

Since the oscillation angle of the reflecting plate 34 corresponding to the zero level is defined as 0 degrees as shown in FIG. 4, the negative maximum level (−Pm) and the maximum level (+Pm) of the sawtooth wave part Wa correspond to a negative maximum oscillation angle and a positive maximum oscillation angle of the reflecting plate 34, respectively.

The corrective wave part Wb is formed of a first half period part 1 of a sinusoidal wave (hereinafter referred to as a "sinusoidal wave first half period part 1") and a constant level part 2. The sinusoidal wave first half period part 1 spans a time period corresponding to the first half of a resonance period (see the reference character "Th" in FIG. 5) which is defined as the inverse of the resonance frequency (hereinafter also referred to as a "resonance frequency fr") intrinsic to the vertical scanning mechanism 30, immediately after the return of the sawtooth wave part Wa from the positive maximum level (+Pm) to the negative maximum level (−Pm).

That is, the time period of the sinusoidal wave first half period part 1 equals the first half of the resonance period Tb (i.e. the inverse of the intrinsic resonance frequency fr explained above). In this illustrative embodiment, the maximum level of the sinusoidal wave first half period part 1 is equal to 1.25 times the half of the amplitude of the sawtooth wave part Wa (see the reference character "Ps" in FIG. 4). Therefore, immediately after the return of the sawtooth wave part Wa to the negative maximum level (−Pm), the sinusoidal wave first half period part 1 rises from the negative maximum level up to the maximum level Ps in the sinusoidal pattern and thereafter returns from the maximum level to the negative maximum level (−Pm) in the sinusoidal pattern. Incidentally, the negative maximum level immediately after the return of the sawtooth wave part Wa to the negative maximum level (−Pm) corresponds to the start point of the sinusoidal wave first half period part 1, and the negative maximum (−Pm) level after the sinusoidal pattern is formed corresponds to the end point of the sinusoidal wave first half period part 1. Meanwhile, the constant level part 2 is formed to maintain its level at the negative maximum level (−Pm) during the second half of the resonance period Tb (i.e. the inverse of the intrinsic resonance frequency fr explained above) starting from the point immediately after the return of the sinusoidal wave first half period part 1 to the negative maximum level (−Pm).

With the vertical scanning wave W configured as above, the reflecting plate 34 smoothly follows the increase in the level of the sawtooth wave and thereafter returns to the negative maximum oscillation angle without being disturbed.

In the formation of the digital vertical scanning wave data by use of the vertical scanning wave W configured as above, the vertical scanning wave W is quantized into values 0-255 as shown in FIG. 5, for example. The sampling number n is set to suit the quantization into 0-255.

Figure 6:
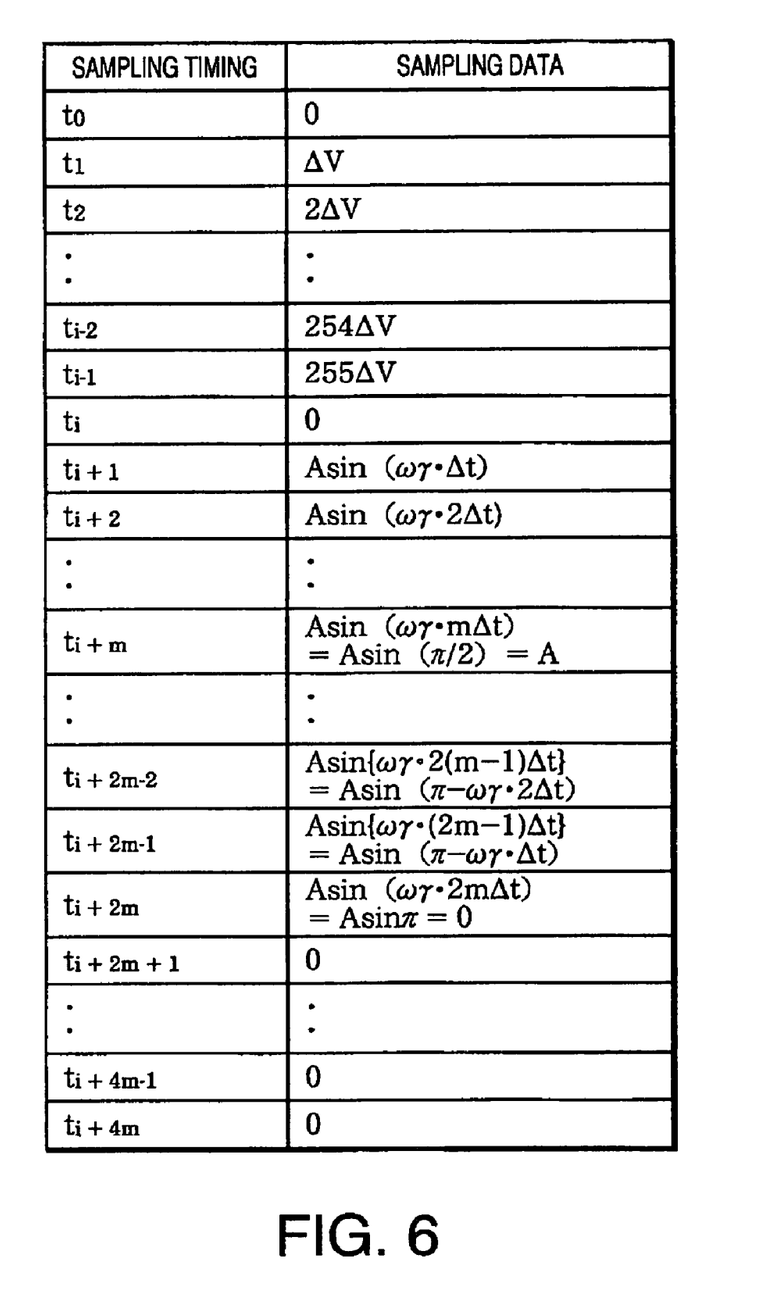
FIG. 6 is a table showing sampling timings and sampling data of the vertical scanning wave in the embodiment.

In this embodiment, the vertical scanning wave W is sampled at n sampling timings $t_1, \ldots, t_i, \ldots, t_m, \ldots, t_n$ (see FIGS. 5 and 6). This means that the period T of the vertical scanning wave W is partitioned into n times of unit period $\Delta t$ and the vertical scanning wave W is sampled in each of the unit periods $\Delta t$. Here, each period $\Delta t$ can be expressed as $\Delta t = t_k - t_{k-1}$, where $k = 1, 2, \ldots, n$ (n: constant).

Specifically, the sawtooth wave part Wa included in the vertical scanning wave W is sampled at sampling timings $t_0, t_1, t_2, \ldots, t_{i-2}, t_{i-1}$ and $t_i$ as sampling data 0, $\Delta V$, $2\Delta V$, ..., $254\Delta V$, $255\Delta V$ and 0, respectively, as shown in the table of FIG. 6.

Meanwhile, the resonance period Tb corresponding to the period of the corrective wave part Wb is partitioned into 4m (=n−i) periods $\Delta t$. If we express a resonance angular frequency corresponding to the resonance frequency fr as $\omega r = 2\pi fr$, the sinusoidal wave first half period part 1 included in the corrective wave part Wb of the vertical scanning wave W is sampled at sampling timings $t_i, t_{i+1}, t_{i+2}, t_{i+m}, t_{i+2m-2}, t_{i+2m-1}$ and $t_{i+2m}$ as sampling data 0, $A \sin(\omega r \cdot \Delta t)$, $A \sin(\omega r \cdot 2\Delta t)$, ..., $A \sin(\omega r \cdot m\Delta t)$, $A \sin(\omega r \cdot 2(m-1)\Delta t)$, $A \sin(\omega r \cdot (2m-1)\Delta t)$ and $A \sin(\omega r \cdot 2m\Delta t)$, respectively, as shown in the table of FIG. 6.

Here, the angle $\omega r \cdot m\Delta t$ in the above sampling data $A \sin(r \cdot m\Delta t)$ equals $\pi/2$ since 4m corresponds to $2\pi$, and thus $A \sin(\omega r \cdot m\Delta t) = A$. Meanwhile, $A \sin(\omega r \cdot 2m\Delta t) = 0$ since $\omega r \cdot 2m\Delta t = \pi$. As above, the sinusoidal wave first half period part 1 has a waveform corresponding to a half period of a sinusoidal wave between phases 0 radian and $\pi$ radian.

The constant level part 2 included in the corrective wave part Wb of the vertical scanning wave W is sampled at sampling timings $t_{i+2m}$, $t_{i+2m+1}$, $t_{i+4m-1}$ and $t_{i+4m-1}$ ($=t_n$) as sampling data 0, 0, 0 and 0, respectively, as shown in the table of FIG. 6. The n pieces of sampling data obtained by the above sampling are formed as digital data representing the vertical scanning wave W (i.e. the aforementioned digital vertical scanning wave data).

The digital vertical scanning wave data formed as above have previously been stored in the prescribed addresses of the ROM 73 to be readable by the microcomputer 70.

The signal processing device B further includes a digital-to-analog converter 80 (hereinafter referred to as a "D/A converter 80"), a vertical scanning wave generating circuit 90 and a vertical scan driving circuit 100. The D/A converter 80 successively converts the digital vertical scanning wave data (successively read out from the prescribed addresses of the ROM 73 of the microcomputer 70) into an analog vertical scanning wave signal, and outputs the analog vertical scanning wave signal to the vertical scanning wave generating circuit 90.

Incidentally, the digital vertical scanning wave data successively read out from the prescribed addresses of the ROM 73 may also be temporarily stored in the RAM 74 and thereafter read out from the RAM 74 as needed, by which the execution of the program in the ROM 73 can be smoothed and high-speed data readout becomes possible. Consequently, generation of a precise waveform with a large sampling number becomes possible.

It is also possible to provide the signal processing device B with an extra RAM, store the digital vertical scanning wave data (successively read out from the prescribed addresses of the ROM 73) in the extra RAM, and thereafter read out the digital vertical scanning wave data from the extra RAM.

The vertical scanning wave generating circuit 90 generates a driving vertical scanning wave signal for actually driving the vertical scanning mechanism 30, by adjusting the amplitude and the direct-current level of the analog vertical scanning wave signal (successively outputted by the D/A converter 80) by use of an amplifier, etc. Here, the waveform of the vertical scanning wave signal (i.e. the vertical scanning wave) is made up of the sawtooth wave part Wa, the sinusoidal wave first half period part 1 and the constant level part 2 (see FIG. 4), in which the central level of the amplitude of the sawtooth wave part Wa is at the zero level.

The vertical scan driving circuit 100 amplifies the vertical scanning wave signal supplied from the vertical scanning wave generating circuit 90 and outputs the amplified signal to the vertical scanning mechanism 30 as vertical scan driving voltages. The vertical scan driving voltages are formed by amplifying the sawtooth wave part Wa, the sinusoidal wave first half period part 1 and the constant level part 2 of the vertical scanning wave signal. Thus, an electric current corresponding to the polarity of the vertical scan driving voltage flows through the electromagnetic coil 37 of the vertical scanning mechanism 30.

The beam generating device C includes a blue laser driving circuit 110a (hereinafter also referred to as a "B-laser driving circuit 110a"), a green laser driving circuit 110b (hereinafter also referred to as a "G-laser driving circuit 110b") and a red laser driving circuit 110c (hereinafter also referred to as an "R-laser driving circuit 110c").

The B-laser driving circuit 110a generates a driving signal for modulating the light intensity of blue laser beam emitted by a blue laser 120a (hereinafter also referred to as a "B-laser 120a") according to the blue driving signal supplied from the video signal processing circuit 50, and outputs the generated driving signal to the B-laser 120a.

The G-laser driving circuit 110b generates a driving signal for modulating the light intensity of a green laser beam emitted by a green laser 120b (hereinafter also referred to as a "G-laser 120b") according to the green driving signal supplied from the video signal processing circuit 50, and outputs the generated driving signal to the G-laser 120b.

The R-laser driving circuit 110c generates a driving signal for modulating the light intensity of a red laser beam emitted by a red laser 120c (hereinafter also referred to as an "R-laser 120c") according to the red driving signal supplied from the video signal processing circuit 50, and outputs the generated driving signal to the R-laser 120c.

The B-laser 120a is equipped with a laser emission unit which emits the blue laser beam. The B-laser 120a modulates the intensity of the blue laser beam emitted by the laser emission unit according to the driving signal supplied from the B-laser driving circuit 110a, and outputs the modulated laser beam to a collimator lens 130a as blue laser intensity-modulated beam.

The G-laser 120b is equipped with a laser emission unit which emits the green laser beam. The G-laser 120b modulates the intensity of the green laser beam emitted by the laser emission unit according to the driving signal supplied from the G-laser driving circuit 110b, and outputs the modulated laser beam to a collimator lens 130b as green laser intensity-modulated beam.

The R-laser 120c is equipped with a laser emission unit which emits the red laser beam. The R-laser 120c modulates the intensity of the red laser beam emitted by the laser emission unit according to the driving signal supplied from the R-laser driving circuit 110c, and outputs the modulated laser beam to a collimator lens 130c as red laser intensity-modulated beam.

The collimator lens 130a collimates the blue laser intensity-modulated beam supplied from the B-laser 120a and outputs the collimated light to a dichroic mirror 140a as blue collimated beam. The collimator lens 130b collimates the green laser intensity-modulated beam supplied from the G-laser 120b and outputs the collimated light to a dichroic mirror 140b as green collimated beam. The collimator lens 130c collimates the red laser modulated beam supplied from the R-laser 120c and outputs the collimated light to a dichroic mirror 140c as red collimated beam.

The dichroic mirror 140c reflects the red collimated beam supplied from the collimator lens 130c toward the dichroic mirror 140b as reflected beam. The dichroic mirror 140b combines (multiplexes) the green collimated beam supplied from the collimator lens 130b and the red collimated beam supplied from the dichroic mirror 140c and outputs the combined beam to the dichroic mirror 140a.

The dichroic mirror 140a combines (multiplexes) the blue collimated beam supplied from the collimator lens 130a and the combined beam supplied from the dichroic mirror 140b and outputs the combined beam to a coupling optical system 150.

The coupling optical system 150 is an optical system which optically couples the dichroic mirror 140a with the incidence end of an optical fiber 160. The coupling optical system 150 converges the combined beam supplied from the dichroic mirror 140a and inputs the converged beam to the incidence end of the optical fiber 160. Incidentally, the coupling optical system 150 is implemented by a convex lens in the first embodiment.

The optical fiber 160 guides the beam from the coupling optical system 150 and outputs the guided beam to the collimator lens 170.

The collimator lens 170 collimates the beam outputted by the optical fiber 160 and supplies the collimated beam to the horizontal scanning mechanism 10 of the optical scanning device A.

In this embodiment configured as above, when the image display device is set in an operating state, the video signal processing circuit 50 of the signal processing device B successively generates the horizontal synchronization signals and the vertical synchronization signals while also generating the blue, green and red driving signals based on the video signal (representing two-dimensional images) supplied from the outside as explained above.

When the horizontal synchronization signals are successively generated by the video signal processing circuit 50 as above, the horizontal scan driving circuit 60 successively generates the horizontal scan driving voltages and outputs the horizontal scan driving voltages to the horizontal scanning mechanism 10. Thus, the horizontal scanning mechanism 10 is driven by the horizontal scan driving voltages successively outputted by the horizontal scan driving circuit 60 and is thereby set in a horizontal scanning state.

Meanwhile, when the vertical synchronization signals are successively generated by the video signal processing circuit 50 as above, each of the vertical synchronization signals is outputted to the microcomputer 70. On each output of the vertical synchronization signal from the video signal processing circuit 50, the microcomputer 70 (CPU 72) executing the prescribed program reads out the digital vertical scanning wave data from the prescribed addresses of the ROM 73 and outputs the digital vertical scanning wave data to the D/A converter 80.

On each output of the digital vertical scanning wave data from the microcomputer 70, the D/A converter 80 converts the digital vertical scanning wave data into the analog vertical scanning wave signal and outputs the analog vertical scanning wave signal to the vertical scanning wave generating circuit 90.

On each output of the analog vertical scanning wave signal from the D/A converter 80, the vertical scanning wave generating circuit 90 generates the vertical scanning wave signal by sweeping the analog vertical scanning wave signal with the sweep voltage along the passage of time, and outputs the generated vertical scanning wave signal to the vertical scan driving circuit 100.

On each output of the vertical scanning wave signal from the vertical scanning wave generating circuit 90, the vertical scan driving circuit 100 amplifies the vertical scanning wave signal and outputs the amplified signal to the vertical scanning mechanism 30 as the vertical scan driving voltage.

Each time the vertical scan driving voltage is supplied to the vertical scanning mechanism 30, the vertical scan driving voltage is applied to the electromagnetic coil 37 of the vertical scanning mechanism 30 from the inner end connecting terminal 37d or from the outer end connecting terminal 37e.

Specifically, when the vertical scan driving voltage (i.e. the sawtooth wave part Wa of the vertical scanning wave signal) is negative, the electric potential of the inner end connecting terminal 37d of the electromagnetic coil 37 becomes negative while that of the outer end connecting terminal 37e of the electromagnetic coil 37 is set at the ground potential, for example. Therefore, the electric current according to the sawtooth wave part Wa of the vertical scan driving voltage passes through the coil unit 37a of the electromagnetic coil 37 from the outer end connecting terminal 37e to the inner end connecting terminal 37d. Incidentally, it is also possible to set the electric potential of the inner end connecting terminal 37d (instead of the outer end connecting terminal 37e) at the ground potential.

Therefore, in the coil unit 37a, the electric current passes through each coil segment 37b from left to right in FIG. 3 while passing through each coil segment 37c from right to left in FIG. 3. Thus, the electric currents passing through the coil segments 37b and the electric currents passing through the coil segments 37c (interacting with the magnetic field from the north pole of the magnet 38 to the south pole of the magnet 39) cause magnetic force that rotates the reflecting plate 34 in the direction of the arrow R1 (see FIG. 2) according to the Fleming's left-hand rule.

On the other hand, when the vertical scan driving voltage (i.e. the sawtooth wave part Wa of the vertical scanning wave signal) is positive, the electric potential of the inner end connecting terminal 37d of the electromagnetic coil 37 becomes positive while that of the outer end connecting terminal 37e of the electromagnetic coil 37 becomes the ground potential. Therefore, the electric current according to the sawtooth wave part Wa of the vertical scan driving voltage passes through the coil unit 37a of the electromagnetic coil 37 from the inner end connecting terminal 37d to the outer end connecting terminal 37e.

Therefore, in the coil unit 37a, the electric current passes through each coil segment 37b from right to left in FIG. 3 while passing through each coil segment 37c from left to right in FIG. 3. Thus, the electric currents passing through the coil segments 37b and the electric currents passing through the coil segments 37c (interacting with the magnetic field from the north pole of the magnet 38 to the south pole of the magnet 39) cause magnetic force that rotates the reflecting plate 34 in the direction of the arrow R2 (see FIG. 2) according to the Fleming's left-hand rule.

The signal level of the sawtooth wave part Wa of the vertical scanning wave signal alternately changes between negative and positive (like an alternating current) in each period of the sawtooth wave part Wa as above, by which the reflecting plate 34 oscillates alternately in the directions of the arrows R1 and R2.

In such an oscillation process, each time the signal level of the sawtooth wave part Wa of the vertical scanning wave signal returns instantly from the positive maximum level (+Pm) to the negative maximum level (−Pm), a rebound occurs to the reflecting plate 34, by which the reflecting plate 34 tends to resonate at the aforementioned intrinsic resonance frequency.

However, the vertical scanning wave signal in this embodiment is configured to include not only the sawtooth wave part Wa but also the sinusoidal wave first half period part 1 and the constant level part 2 (which are employed as the corrective wave part Wb) as mentioned above. Thus, even when the reflecting plate 34 is about to resonate as explained above, the sinusoidal wave first half period part 1 functions to suppress the resonance at the point of the return of the sawtooth wave part Wa of the vertical scanning wave signal to the negative maximum level (−Pm). After the suppressing operation, the constant level part 2 functions to further suppress the resonance of the reflecting plate 34. In other words, the period Tb of the corrective wave part Wb has a significance as a resonance correction period for suppressing the resonance of the reflecting plate 34.

Figure 7:
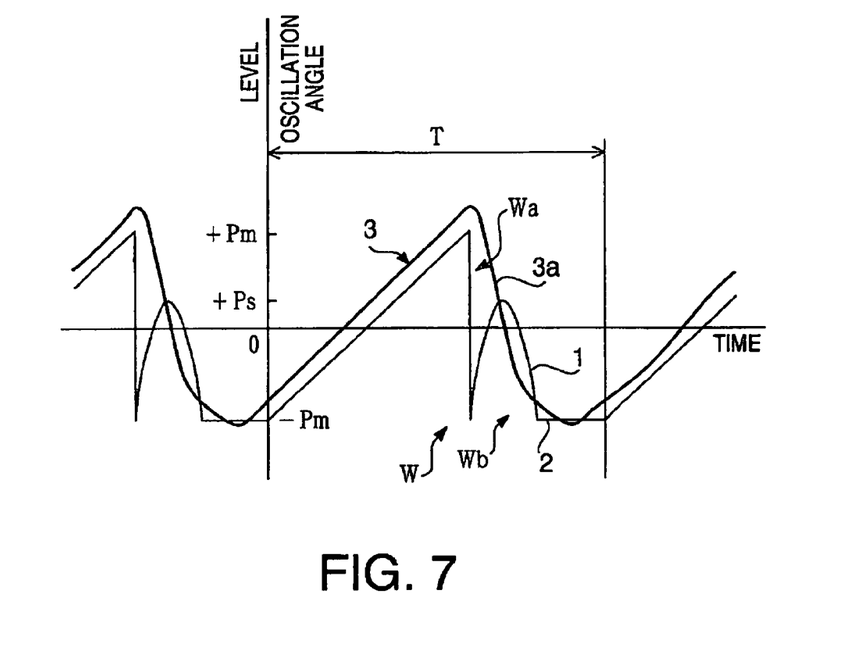
FIG. 7 is a waveform chart showing the waveform of a vertical scanning wave signal and oscillation properties of the reflecting plate in the vertical scanning mechanism in the embodiment.

As above, the resonance of the reflecting plate 34, which tends to occur when the sawtooth wave part Wa of the vertical scanning wave signal W returns to the negative maximum level (−Pm), is suppressed securely with excellent timing. Consequently, the reflecting plate 34 is allowed to smoothly return to the negative maximum oscillation angle (corresponding to the negative maximum level (−Pm) of the sawtooth wave part Wa) with no resonance as indicated by the reference character "3a" in FIG. 7, in each period T of the vertical scanning wave signal. Thus, the vertical scanning mechanism 30 is maintained in a desirable vertical scanning state with no resonance. Incidentally, the reference character "3" in FIG. 7 represents a waveform indicating the change in the oscillation angle of the reflecting plate 34 according to the level change of the vertical scanning wave signal W. The aforementioned reference character "3a" represents a part of the waveform 3 indicating the returning process of the reflecting plate 34 to the negative maximum oscillation angle.

When the blue, green and red driving signals are generated by the video signal processing circuit 50 based on the video signal (representing two-dimensional images) supplied from the outside as explained above, each laser driving circuit 110a, 110b, 110c of the beam formation device C drives each laser 120a, 120b, 120c, respectively, so as to modulate the light intensity of the laser beam emitted from the laser emission unit of each laser 120a, 120b, 120c.

Accordingly, each laser 120a, 120b, 120c modulates the intensity of the laser light and emits the modulated laser light to each collimator lens 130a, 130b, 130c, respectively, as (beam-like) laser intensity-modulated image light. Then, each collimator lens 130a, 130b, 130c collimates the laser intensity-modulated image light and outputs the collimated image light to each dichroic mirror 140a, 140b, 140c.

The dichroic mirror 140c reflects the collimated image light supplied from the collimator lens 130c toward the dichroic mirror 140b. The dichroic mirror 140b combines (multiplexes) the collimated image light supplied from the collimator lens 130b and the reflected image light from the dichroic mirror 140c and outputs the combined image light to the dichroic mirror 140a.

Accordingly, the dichroic mirror 140a combines (multiplexes) the collimated image light supplied from the collimator lens 130a and the combined image light supplied from the dichroic mirror 140b and outputs the combined image light to the coupling optical system 150. Then, the coupling optical system 150 converges the combined image light supplied from the dichroic mirror 140a and inputs the converged image light to the collimator lens 170 via the optical fiber 160. The collimator lens 170 collimates the incident image light and outputs the collimated image light to the horizontal scanning mechanism 10 of the optical scanning device A.

Since the horizontal scanning mechanism 10 is in the horizontal scanning state at this time as explained above, the collimated image light supplied from the collimator lens 170 is horizontally scanned by the horizontal scanning mechanism 10 and reflected toward the relay optical system 20 as the horizontally scanned image light. The horizontally scanned image light is converged by the relay optical system 20 and outputted to the vertical scanning mechanism 30.

Since the vertical scanning mechanism 30 is in the vertical scanning state at this time as explained above, the horizontally scanned image light supplied from the relay optical system 20 is vertically scanned by the vertical scanning mechanism 30 and reflected toward the relay optical system 40 as the vertically scanned image light In the vertical scanning, the reflecting plate 34 of the vertical scanning mechanism 30 oscillates smoothly as indicated by the waveform 3 in FIG. 7. Thus, the vertical scanning of the horizontally scanned image light supplied from the relay optical system 20 is executed correctly by the vertical scanning mechanism 30, and the resultant vertically scanned image light is supplied to the relay optical system 40.

The vertically scanned beam supplied from the vertical scanning mechanism 30 is converged by the relay optical system 40 and is applied to the pupil Ia of the left eye I, by which high-quality two-dimensional images can be presented to (projected onto) the retina Ib of the left eye I.

Figure 8:
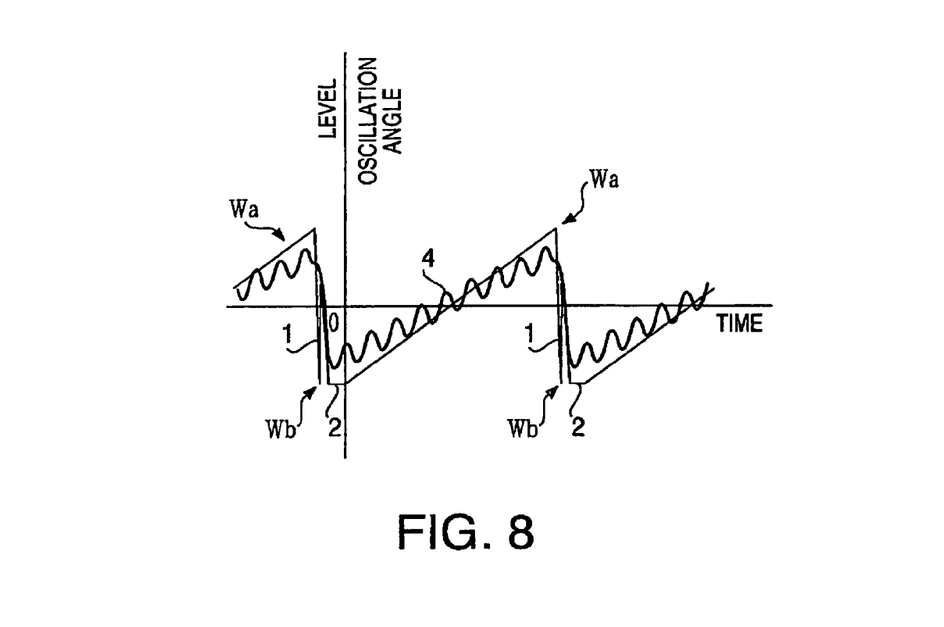
FIG. 8 is a waveform chart showing the waveform of the vertical scanning wave signal and the oscillation properties of the reflecting plate in the vertical scanning mechanism in the embodiment in a case where the maximum level of a sinusoidal wave first half period part is set at the half of the amplitude of a sawtooth wave part.

Incidentally, the present inventors have made an examination regarding an appropriate range of the maximum level of the sinusoidal wave first half period part 1 of the vertical scanning wave signal. By the examination, we found that the reflecting plate 34 oscillates following the change in the value of the sawtooth wave part Wa while pulsating as indicated by the reference character "4" in FIG. 8 when the maximum level Ps of the sinusoidal wave first half period part 1 is set at the half of the difference between the maximum value and the minimum value of the sawtooth wave part Wa.

We also found that the reflecting plate 34 oscillates excellently following the level change of the sawtooth wave part Wa with no pulsation as indicated by the reference character "3" in FIG. 7 when the maximum level Ps of the sinusoidal wave first half period part 1 is set at "A" times the half of the difference between the maximum value and the minimum value of the sawtooth wave part Wa. The value "A" is a constant which is intrinsic to each optical scanning device and is determined based on the waveform of the sawtooth wave part Wa and the configuration of each device. The constant A is a value corresponding to the maximum voltage necessary for achieving a desired swing angle. In this experiment, the constant A has been set so that a maximum voltage of 17V is necessary for achieving a swing angle of 12°, for example. Preferably, the constant has a value within a range from 1.0 through 2.0.

Further, in cases of vertical scanning mechanisms having different resonance frequencies or vertical scanning mechanisms having the same frequency but different configurations, we found that there exists a condition of the maximum level Ps of the sinusoidal wave first half period part 1 for the reflecting plate 34 to oscillate satisfactorily following the level change of the sawtooth wave part Wa, within a range between the half of the difference between the maximum value and the minimum value of the sawtooth wave part Wa and the maximum level of the amplitude.

Therefore, even though it is desirable that the maximum level Ps of the sinusoidal wave first half period part 1 be set at "A" times the half of the difference between the maximum value and the minimum value of the sawtooth wave part Wa, there is no problem in practical use if the maximum level Ps is set at a level between the half of the difference between the maximum value and the minimum value of the sawtooth wave part Wa and the maximum level of the amplitude (e.g., A=1.25).

Next, we made an examination regarding an appropriate range of the frequency of the sawtooth wave part Wa of the aforementioned vertical scan driving voltage (i.e. the vertical scanning wave signal). By the examination, a result shown in FIG. 9 was obtained when the frequency of the sawtooth wave part Wa was set at 100 (Hz), while a result shown in FIG. 10 was obtained when the frequency of the sawtooth wave part Wa was set at 200 (Hz).

Figure 9:
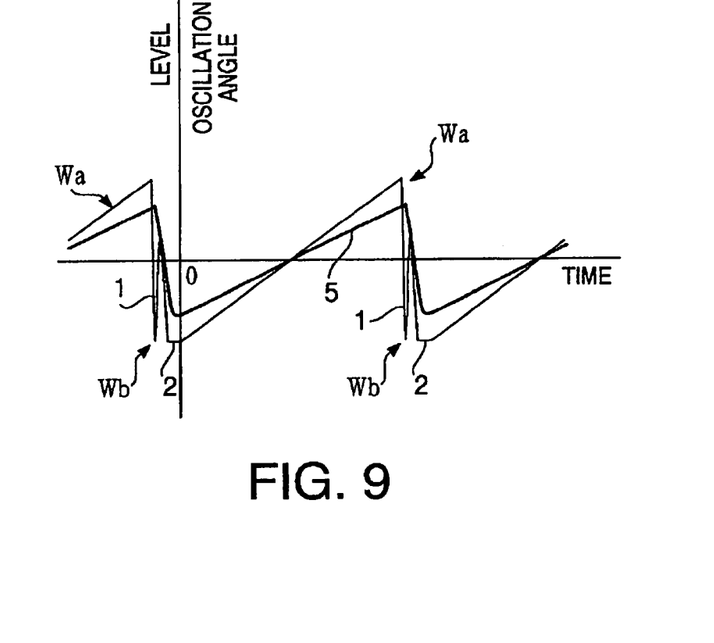
FIG. 9 is a waveform chart showing the waveform of the vertical scanning wave signal and the oscillation properties of the reflecting plate in the vertical scanning mechanism in the embodiment in a case where the frequency of the sawtooth wave part is set at 100 (Hz).
Figure 10:
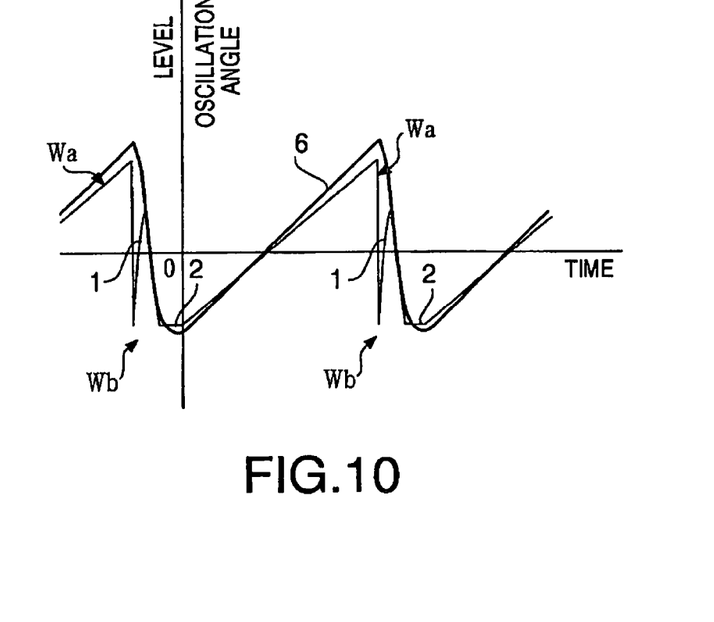
FIG. 10 is a waveform chart showing the waveform of the vertical scanning wave signal and the oscillation properties of the reflecting plate in the vertical scanning mechanism in the embodiment in a case where the frequency of the sawtooth wave part is set at 200 (Hz).

In the results shown in FIGS. 9 and 10, the oscillation angle of the reflecting plate 34 changes smoothly following the level of the sawtooth wave part Wa as indicated by the reference characters "5" and "6" in FIGS. 9 and 10. Also in examinations further changing the frequency of the sawtooth wave part Wa, we found that the oscillation angle of the reflecting plate 34 changes smoothly following the level of the sawtooth wave part Wa in the same way.

Next, we made an examination regarding the relationship between a sawtooth wave formation range and the frequency of the sawtooth wave part Wa, by use of the resonance frequency of the vertical scanning mechanism 30 as a parameter. By the examination, the graphs a-h shown in FIG. 11 were obtained.

Figure 11:
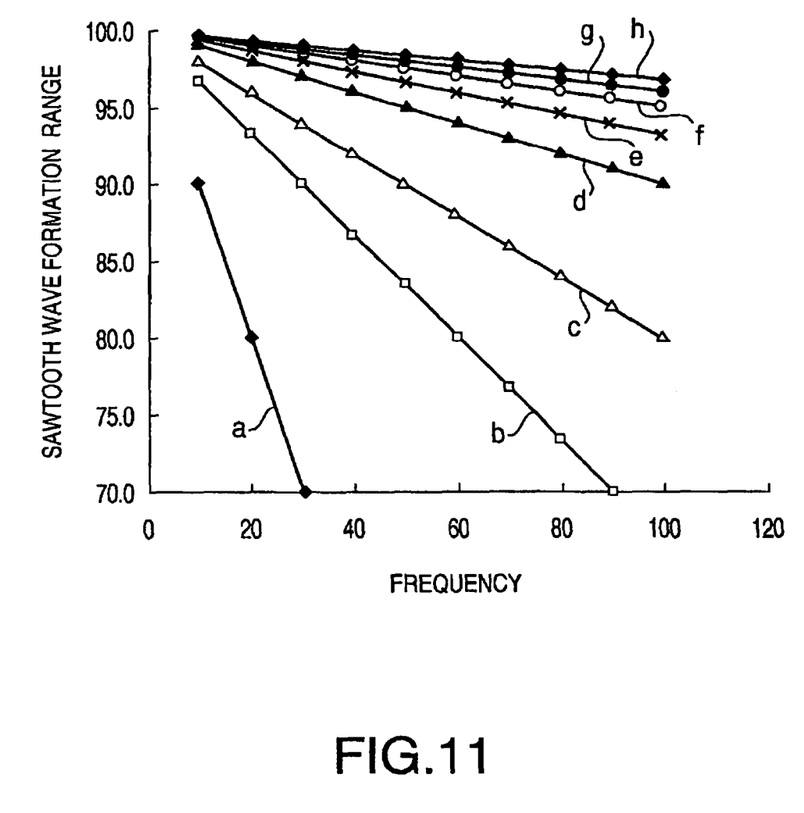
FIG. 11 is a graph showing the relationship between a sawtooth wave range and the frequency of the sawtooth wave part by use of the resonance frequency as a parameter.

In FIG. 11, the graphs a, b and c indicate the relationship between the sawtooth wave formation range and the frequency of the sawtooth wave part Wa when the resonance frequency of the vertical scanning mechanism 30 was set at 100 (Hz), 300 (Hz) and 500 (Hz), respectively.

The graphs d, e, f, g and e indicate the relationship between the sawtooth wave formation range and the frequency of the sawtooth wave part Wa when the resonance frequency of the vertical scanning mechanism 30 was set at 1 (kHz), 1.5 (Hz), 2 (kHz), 2.5 (kHz) and 3 (kHz), respectively.

The graphs a-h indicate that the resonance frequency of the vertical scanning mechanism 30 is desired to be 300 (Hz) or higher to achieve a sawtooth wave formation range of 80(%) or more when the appropriate range of the frequency of the sawtooth wave part Wa is 30 (Hz)-100 (Hz).

Comparing a case where the vertical scanning by the vertical scanning mechanism 30 is executed using the aforementioned vertical scan driving voltage and a case where the vertical scanning by the vertical scanning mechanism 30 is executed using sinusoidal voltage, a constant scan speed zone (time period), in which the scan speed of the light reflected by the reflecting surface of the reflecting plate 34 is constant, amounts to approximately 80% of one scan period of the vertical scanning mechanism having a resonance frequency of 300 Hz in the case where the vertical scan driving voltage is used. On the other hand, in the sinusoidal driving, even though there exists a zone thai can be approximated as constant-speed scan, the zone is just a part of the entire scan period. The linear range of the sawtooth wave part Wa is far wider than that of the sinusoidal voltage, and thus the effective range of vertical scanning can be made considerably wide by use of the sawtooth wave part Wa.

In this embodiment, the vertical scanning is executed by use of the vertical scan driving voltage explained above. Therefore, the reflecting plate 34 oscillates smoothly following the level change of the sawtooth wave part Wa as explained above. Consequently, the aforementioned effective range of vertical scanning can be secured considerably wide thanks to the excellent vertical scanning operation.

Further, the vertical scanning in this embodiment, executed by use of the sawtooth wave part of the vertical scanning wave signal, has excellent uniformity (in scanning speed) across a wide range. Therefore, it becomes unnecessary to drive the vertical scanning mechanism by use of a sinusoidal wave and carry out the $\sin^{-1}\Theta$ correction.

Incidentally, the present invention can be implemented in various ways without restricting it to the above embodiment as follows, for example.

The image display device in the above embodiment is not restricted to the use for the left eye of the user, the image display device is usable also for the right eye of the user.

Effects similar to those of the above embodiment can be achieved even if a trapezoidal wave part, a triangular wave part or a rectangular wave part is employed instead of the sinusoidal wave first half period part 1 of the corrective wave part Wb.

The level of the constant level part 2 of the corrective wave part Wb is not restricted to the negative maximum level (−Pm) of the sawtooth wave part Wa; the constant level may also be changed to a proper level.

The present invention is applicable not only to retinal scanning image display devices but also to various types of optical scanning display devices.

The present invention is applicable not only to the vertical scanning by the vertical scanning mechanism 30 but also to the horizontal scanning by the horizontal scanning mechanism 10.

The image display device may be equipped with a temperature sensor 180 for detecting the temperature of the vertical scanning mechanism 30, and the resonance frequency intrinsic to the vertical scanning mechanism 30 may be corrected by the microcomputer 70 (CPU 72) based on the temperature detected by the temperature sensor 180. A data part of the digital vertical scanning wave data corresponding to the corrective wave part Wb may be corrected based on the corrected resonance frequency and the corrected digital vertical scanning wave data may be supplied to the DIA converter 80. Specifically, when the temperature changes, the intrinsic frequency of the scanner may change (i.e., the resonance frequency may change). Therefore, data representing the corrected wave corresponding to the detected temperature may be preliminary stored, and an appropriate corrective wave may be retrieved from the data in accordance with the temperature detected by the temperature sensor 180.

With this configuration, the waveform of the corrective wave part Wb included in the vertical scanning wave is corrected based on the temperature of the vertical scanning mechanism 30, by which the vertical scanning by the vertical scanning mechanism 30 can be carried out with higher accuracy.

The constant level part 2 described above may also be a substantially constant level part (e.g. a part with gradually changing level).

Effects similar to those of the above embodiment can be achieved even if the waveform of the vertical scanning wave signal (i.e. the vertical scanning wave) is inverted vertically.

The height and length of the magnet 38 or 39 are not necessarily required to be equal to the thickness and width of the reflecting plate 34; the magnet height/length may also be greater or smaller than the reflecting plate thickness/width.

What is claimed is:

1. An optical scanning device, comprising:
   a scanning unit including an oscillating element which is elastically and rotatably supported so as to rotatably oscillate, a light beam incident on the scanning unit being deflected to scan as the oscillating element oscillates;
   a scanning signal generating unit which generates a scanning signal within a predetermined period, the scanning signal including a sawtooth wave part and a corrective wave part which is formed based on a resonance frequency intrinsic to the scanning unit; and
   a driving unit which drives the scanning unit to oscillate the oscillating element in accordance with the scanning signal,
   wherein the scanning signal generating unit generates the sawtooth wave part in a former term of the predetermined period and the corrective wave part in a latter term of the predetermined period.

2. The optical scanning device according to claim 1, wherein the former term is set as a term for scanning light that is incident upon the oscillating element and the latter term is set as a term for returning the oscillating element to a scan starting position.

3. The optical scanning device according to claim 1,
wherein the latter term is a term corresponding to a resonance period regarding the intrinsic resonance frequency, and
wherein the corrective wave part is formed in the term corresponding to the resonance period.

4. The optical scanning device according to claim 1, wherein the corrective wave part includes a sinusoidal wave first half period part in a first half of the latter term and a substantially constant level part in a second half of the latter term.

5. The optical scanning device according to claim 4,
wherein a maximum level of the sinusoidal wave first half period part is set at a level within a range of 0.5-1.0 times the difference between the maximum value and the minimum value of the sawtooth wave part, and
wherein a start point and an end point of the sawtooth wave part, a start point and an end point of the sinusoidal wave first half period part, and the substantially constant level part are set at substantially the same level.

6. The optical scanning device according claim 1, wherein:
the oscillating element has a mirror surface upon which light is incident, and
the driving unit includes a magnet and an electromagnetic coil which is provided on a surface opposite to the mirror surface of the oscillating member, the electromagnetic coil generating an electric field interacting with the magnet to oscillate the oscillating member according to the scanning signal applied to the electromagnetic coil.

7. The optical scanning device according to claim 1, further comprising:
a temperature detecting unit which detects temperature of the scanning unit; and
a correcting unit which corrects the intrinsic resonance frequency based on the temperature detected by the temperature detecting unit,
wherein the scanning signal generating unit forms the corrective wave part based on the intrinsic resonance frequency corrected by the correcting means.

8. An image display device, comprising:
a beam emitting unit which emits a beam carrying image information;
a horizontal scanning unit which horizontally scans the beam emitted by the beam emitting unit;
a vertical scanning unit which vertically scans the beam scanned by the horizontally scanned unit;
wherein at least one of the horizontal scanning unit and the vertical scanning unit is implemented by an optical scanning device including:
a scanning unit including an oscillating element which is elastically and rotatably supported so as to rotatably oscillate, the light beam incident on the scanning unit being deflected to scan as the oscillating element oscillates;
a scanning signal generating unit which generates a scanning signal within a predetermined period, the scanning signal including a sawtooth wave part and a corrective wave part which is formed based on a resonance frequency intrinsic to the scanning unit; and
a driving unit which drives the scanning unit to oscillate the oscillating element in accordance with the scanning signal,
wherein the scanning signal generating unit generates the sawtooth wave part in a former term of a predetermined period and the corrective wave part in a latter term of the predetermined period.

9. The image display device according to claim 8, wherein the former term is set as a term for scanning light that is incident upon the oscillating element and the latter term is set as a term for returning the oscillating element to a scan starting position.

10. The image display device according to claim 8,
wherein the latter term is a term corresponding to a resonance period regarding the intrinsic resonance frequency, and
wherein the corrective wave part is formed in the term corresponding to the resonance period.

11. The image display device according to claim 8, wherein the corrective wave part includes a sinusoidal wave first half period part in a first half of the latter term and a substantially constant level part in a second half of the latter term.

12. The image display device according to claim 11,
wherein a maximum level of the sinusoidal wave first half period part is set at a level within a range of 0.5-1.0 times the difference between the maximum value and the minimum value of the sawtooth wave part, and
wherein a start point and an end point of the sawtooth wave part, a start point and an end point of the sinusoidal wave first half period part, and the substantially constant level part are set at substantially the same level.

13. The image display device according claim 8, wherein:
the oscillating element has a mirror surface upon which light is incident, and
the driving unit includes a magnet and an electromagnetic coil which is provided on a surface opposite to the mirror surface of the oscillating member, the electromagnetic coil generating an electric field interacting with the magnet to oscillate the oscillating member according to the scanning signal applied to the electromagnetic coil.

14. The image display device according to claim 8, further comprising:
a temperature detecting unit which detects temperature of the scanning unit; and
a correcting unit which corrects the intrinsic resonance frequency based on the temperature detected by the temperature detecting unit,
wherein the scanning signal generating unit forms the corrective wave part based on the intrinsic resonance frequency corrected by the correcting means.

15. A method for driving a scanning unit including an oscillating element which is elastically and rotatably supported to be capable of rotatably oscillating, comprising the steps of:
generating a driving signal including a sawtooth wave part and a corrective wave part which is formed based on a resonance frequency intrinsic to the scanning unit within a predetermined period; and
driving the scanning unit in accordance with the driving signal,
wherein the step of generating generates the sawtooth wave part in a former term of a predetermined period and the corrective wave part in a latter term of the predetermined period.

16. The method according to claim 15, wherein the former term is set as a term for scanning light that is incident upon the oscillating element and the latter term is set as a term for returning the oscillating element to a scan starting position.

17. The method according to claim 15,
wherein the latter term is a term corresponding to a resonance period regarding the intrinsic resonance frequency, and
wherein the corrective wave part is formed in the term corresponding to the resonance period.

18. The method according to claim 15, wherein the corrective wave part includes a sinusoidal wave first half period part in a first half of the latter term and a substantially constant level part in a second half of the latter term.

19. The method according to claim 18,
wherein a maximum level of the sinusoidal wave first half period part is set at a level within a range of 0.5-1.0 times the difference between the maximum value and the minimum value of the sawtooth wave part, and
wherein a start point and an end point of the sawtooth wave part, a start point and an end point of the sinusoidal wave first half period part, and the substantially constant level part are set at substantially the same level.

20. The method according to claim 15, further comprising the steps of:
detecting temperature of the scanning unit; and
correcting the intrinsic resonance frequency based on the temperature detected by the temperature detecting unit,
wherein the step of generating forms the corrective wave part based on the intrinsic resonance frequency corrected by the correcting means.

* * * * *